United States Patent
Park

(10) Patent No.: US 12,269,342 B2
(45) Date of Patent: Apr. 8, 2025

(54) ROLLABLE DISPLAY SYSTEM AND METHOD OF ADAPTIVELY ADJUSTING VIEW RANGE OF ROLLABLE MONITOR ACCORDING TO DRIVER

(71) Applicants: HYUNDAI MOTOR COMPANY, Seoul (KR); KIA CORPORATION, Seoul (KR)

(72) Inventor: Jae Seok Park, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 135 days.

(21) Appl. No.: 17/988,301

(22) Filed: Nov. 16, 2022

(65) Prior Publication Data
US 2023/0191909 A1 Jun. 22, 2023

(30) Foreign Application Priority Data
Dec. 21, 2021 (KR) ........................ 10-2021-0183681

(51) Int. Cl.
*B60K 35/00* (2024.01)
*B60K 35/22* (2024.01)
(Continued)

(52) U.S. Cl.
CPC .............. *B60K 35/00* (2013.01); *G06F 3/013* (2013.01); *H04N 7/183* (2013.01); *B60K 35/22* (2024.01);
(Continued)

(58) Field of Classification Search
CPC ........ B60K 35/00; B60K 35/22; B60K 35/28; B60K 35/53; B60K 35/65; B60K 35/81; B60K 2360/166; B60K 2360/48; B60K 2360/741; B60K 2360/149; B60K 2360/167; B60K 35/10; B60K 35/223; B60K 35/23; G06F 3/013; H04N 7/183; B60R 2300/20; B60R 1/24;
(Continued)

(56) References Cited

U.S. PATENT DOCUMENTS

| 2002/0067366 A1* | 6/2002 | Hirao | ...................... G09G 5/00 |
| | | | 345/660 |
| 2009/0140845 A1* | 6/2009 | Hioki | ..................... B60K 35/00 |
| | | | 340/425.5 |

(Continued)

FOREIGN PATENT DOCUMENTS

| CN | 115206262 A | * | 10/2022 | |
| KR | 20140058312 A | * | 5/2014 | |
| WO | WO-2016208722 A1 | * | 12/2016 | ............. B60K 35/00 |

OTHER PUBLICATIONS

English Translation CN 115206262 (Year: 2022).*
English Translation KR 20140058312 (Year: 2014).*

*Primary Examiner* — Fernando Alcon
(74) *Attorney, Agent, or Firm* — Morgan, Lewis & Bockius LLP

(57) ABSTRACT

Proposed are a rollable display system capable of adaptively adjusting a height of a rollable monitor in consideration of a driver and enlarging and reproducing an image of a blind spot of the driver in front of a vehicle occurring depending on road conditions, and a method of adaptively adjusting a view range of the rollable monitor in consideration of the driver.

11 Claims, 11 Drawing Sheets

(51) Int. Cl.
*B60K 35/28* (2024.01)
*B60K 35/53* (2024.01)
*B60K 35/65* (2024.01)
*B60K 35/81* (2024.01)
*G06F 3/01* (2006.01)
*H04N 7/18* (2006.01)

(52) U.S. Cl.
CPC .............. *B60K 35/28* (2024.01); *B60K 35/53* (2024.01); *B60K 35/65* (2024.01); *B60K 35/81* (2024.01); *B60K 2360/166* (2024.01); *B60K 2360/48* (2024.01); *B60K 2360/741* (2024.01)

(58) Field of Classification Search
CPC .............. B60R 11/0229; B60R 16/037; G02B 2027/0181; G02B 27/0101; G02B 2027/0138; G02B 27/0093; B60W 40/08; B60W 50/14; B60W 2050/146; B60W 40/076; B60W 2050/0043; B60W 2420/403; B60W 2420/408; B60W 2540/225; B60W 2552/15
See application file for complete search history.

(56) References Cited

U.S. PATENT DOCUMENTS

| | | | |
|---|---|---|---|
| 2014/0125583 A1* | 5/2014 | Aoki | B60K 35/60 |
| | | | 345/156 |
| 2014/0129987 A1* | 5/2014 | Feit | G06F 3/04817 |
| | | | 715/835 |
| 2018/0120572 A1* | 5/2018 | Watanabe | G06V 40/193 |
| 2018/0210210 A1* | 7/2018 | Yamamura | B60R 1/001 |
| 2019/0171011 A1* | 6/2019 | Ogasawara | G02B 27/0179 |
| 2019/0235241 A1* | 8/2019 | Suzuki | G02B 27/01 |
| 2021/0107356 A1* | 4/2021 | Watanabe | G06V 20/20 |
| 2021/0116710 A1* | 4/2021 | Masuya | G02B 27/0101 |
| 2021/0311305 A1* | 10/2021 | Hada | G02B 27/0101 |
| 2021/0390897 A1* | 12/2021 | Kim | G09G 3/3208 |
| 2022/0058998 A1* | 2/2022 | Yagyu | G06T 7/70 |
| 2022/0130296 A1* | 4/2022 | Kamiya | B60W 50/16 |
| 2022/0174262 A1* | 6/2022 | Kusafuka | H04N 13/398 |
| 2022/0277673 A1* | 9/2022 | Iwasaki | G06F 3/013 |
| 2022/0281317 A1* | 9/2022 | Ahn | B60W 40/08 |
| 2022/0397975 A1* | 12/2022 | Iliffe-Moon | G06F 3/04886 |
| 2023/0069348 A1* | 3/2023 | Park | G02B 27/0179 |
| 2024/0010144 A1* | 1/2024 | Derichs | B60R 16/037 |
| 2024/0042857 A1* | 2/2024 | Mimura | B60K 35/235 |
| 2024/0087491 A1* | 3/2024 | Jiang | G06T 7/70 |

* cited by examiner

ROLLABLE DISPLAY SYSTEM AND METHOD OF ADAPTIVELY ADJUSTING VIEW RANGE OF ROLLABLE MONITOR ACCORDING TO DRIVER

This application claims the benefit of Korean Patent Application No. 10-2021-0183681, filed on Dec. 21, 2021 in the Korean Intellectual Property Office, which is hereby incorporated by reference as if fully set forth herein.

TECHNICAL FIELD

The present disclosure relates to a rollable display system, and more particularly, to a rollable display system capable of adaptively adjusting a height of a rollable monitor in consideration of a driver and reproducing a blind spot in front of a vehicle occurring depending on road conditions as an image, and a method of adaptively adjusting a view range of the rollable monitor in consideration of the driver.

BACKGROUND

A cluster and audio/video/navigation/telematics (AVNT) are installed on a front panel of a vehicle. The cluster displays a speedometer, RPM, and fuel flow, and the AVNT includes audio, video, a navigation device, and telematics, which is a vehicle wireless Internet service combining wireless communication with a vehicle.

FIG. 1 describes a conventional example of the front panel of the vehicle.

Referring to FIG. 1, it may be seen that conventionally, a cluster and an AVNT, each of which has a form obtained by consecutively connecting three panels having resolutions of 640×720, have been mounted.

The driver may visually check and utilize the cluster and AVNT. However, since the cluster and AVNT are fixed to the front panel, it is impossible to move the cluster and AVNT up and down or move the cluster and AVNT left and right.

A field of view of a taller seated driver may include a region closer to a front of the vehicle compared to a field of view of a shorter seated driver. A driver seated close to a steering wheel has a better view of the front of the vehicle than a driver seated farther from the steering wheel. As such, the perspective of a driver is different depending on the type of vehicle and the gender and body type of the driver of the vehicle.

The driver sits in the seat of the driver of the vehicle and adjusts the height of the steering wheel or moves the seat forward or backward or up and down to ensure an optimum field of view according to the height of the driver. However, the height of the cluster or AVNT cannot be adjusted. Therefore, when a range of a blind spot in a low area in front of the vehicle is increased by driving on a slope, the driver needs to drive so as to be constantly prepared for an accident.

In a conventional vehicle, with reference to eyes of a driver, a certain space $D_1$ formed between an upper surface of each of the cluster and AVNT and a boundary part of a front panel and a windshield is hardly used except for purposes such as placing objects, and thus effective use thereof is necessary.

Republic of Korea Patent Publication: 10-2020-0048729 (May 8, 2020)

SUMMARY

Accordingly, the present disclosure is directed to a rollable display system and a method of adaptively adjusting a view range of a rollable monitor in consideration of a driver that substantially obviate one or more problems due to limitations and disadvantages of the related art.

An object of the present disclosure is to provide a rollable display system capable of adaptively adjusting a height of a rollable monitor in consideration of a driver and enlarging and of reproducing an image of a blind spot of the driver in front of a vehicle depending on road conditions.

Another object of the present disclosure is to provide a method of adaptively adjusting a view range of a rollable monitor in consideration of a driver, which may adaptively adjusting a height of the rollable monitor in consideration of the driver and enlarge and reproduce an image of a blind spot of the driver in front of a vehicle depending on road conditions.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a rollable monitor system includes an image acquisition device configured to acquire an image of a low area in front of a vehicle, an inclination detection device configured to detect an inclination of the vehicle, an eye level detection device configured to detect an eye level of a driver, and a rollable display device installed in a dashboard of the vehicle or attached to an upper part of the dashboard, and configured to adjust a height of a rollable monitor mounted inside using the inclination and the eye level and to reproduce the image on at least a part of the rollable monitor.

In another aspect of the present disclosure, a method of adaptively adjusting a view range of a rollable monitor in consideration of a driver, includes detecting an eye level of the driver using a eye level detection sensor immediately after the driver gets in a vehicle and turns on an ignition, detecting an inclination of the vehicle using an inclination detection device when the vehicle is stopped or in motion, acquiring an image of a low area in front of the vehicle in real time using an image acquisition device, comparing, by a signal-processing device, the eye level of the driver and the inclination of the vehicle with information about a basic field of view of the driver stored in advance to calculate an extension height of the rollable monitor, and extending the rollable monitor to from a body of a rollable display device including the rollable monitor by the calculated extension height.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DISCLOSURE

Reference will now be made in detail to the preferred embodiments of the present disclosure, examples of which are illustrated in the accompanying drawings. Wherever possible, the same reference numbers will be used throughout the drawings to refer to the same or like parts.

Figure 2:
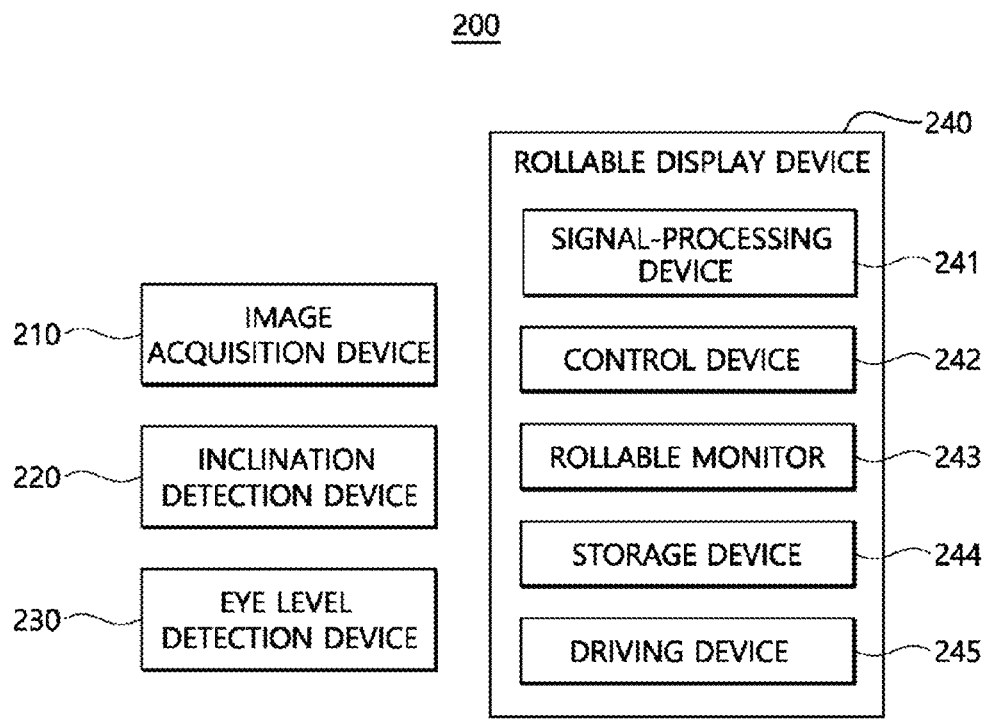
FIG. 2 is an embodiment of a rollable display system according to the present disclosure.

FIG. 2 is an embodiment of a rollable display system according to the present disclosure.

Referring to FIG. 2, a rollable display system 200 according to the present disclosure includes an image acquisition device 210, an inclination detection device 220, an eye level detection device 230, and a rollable display device 240.

According to an exemplary embodiment of the present disclosure, the rollable display system 200 may include a processor (e.g., computer, microprocessor, CPU, ASIC, circuitry, logic circuits, etc.) and an associated non-transitory memory storing software instructions which, when executed by the processor, provides the functionalities of the image acquisition device 210, the inclination detection device 220, the eye level detection device 230, and the rollable display device 240. Herein, the memory and the processor may be implemented as separate semiconductor circuits. Alternatively, the memory and the processor may be implemented as a single integrated semiconductor circuit. The processor may embody one or more processor(s).

The image acquisition device 210 of the rollable display system 200 includes a plurality of cameras or LiDAR installed in a vehicle to acquire images around the vehicle. In particular, in the present disclosure, an image of a blind spot of a driver in a lower region in front of the vehicle is acquired, and an image of a blind spot that increases when the vehicle is traveling on flat ground as well as on a slope is reproduced on the rollable display device 240, thereby helping the driver drive safely.

The inclination detection device 220 of the rollable display system 200 is installed in the vehicle to detect an inclination of a road. At the end of an uphill road, a region of the low area in front of the vehicle is reduced in a basic field of view of the driver, and thus there is inconvenience to be careful while driving. In order to eliminate this inconvenience, the present disclosure proposes to use detected inclination (tilt) information of a road to increase or decrease a region of an image of the low area in front of the vehicle reproduced in the rollable display system 200 according to the present disclosure according to the inclination of the road.

The eye level detection device 230 of the rollable display system 200 detects an eye level of the driver to anticipate a basic field of view of the driver while driving, and adjusts the installation height of the rollable display device 240 described later so as to be fall within a range that does not interfere with the basic field of view of the driver.

A sensor for detecting an inclination of the vehicle and therefore an inclination of the road and a sensor for detecting an eye level are not the core idea of the present disclosure and have already been widely disseminated, and thus a detailed description thereof will be omitted.

The rollable display device 240 of the rollable display system 200 may be used by being installed in a vehicle dashboard (DASH BOARD) or attached to an upper part of the dashboard, and includes a signal-processing device 241, a control device 242, a rollable monitor 243, a storage device 244, and a driving device 245.

According to an exemplary embodiment of the present disclosure, the rollable display device 240 may include a processor (e.g., computer, microprocessor, CPU, ASIC, circuitry, logic circuits, etc.) and an associated non-transitory memory storing software instructions which, when executed by the processor, provides the functionalities of the signal-processing device 241, the control device 242, the rollable monitor 243, the storage device 244, and the driving device 245. Herein, the memory and the processor may be implemented as separate semiconductor circuits. Alternatively, the memory and the processor may be implemented as a single integrated semiconductor circuit. The processor may embody one or more processor(s).

The signal-processing device 241 of the rollable display device 240 processes an image, an inclination, and an eye level received from the image acquisition device 210, the inclination detection device 220, and the eye level detection device 230, compares a range of a basic field of view according to the inclination of the vehicle and the eye level of the driver, and determines the height of the rollable monitor 243 that extends from a body of the rollable display device 240 which includes the rollable monitor 243 therein and is opened to the outside of the body of the rollable display device 240. Here, the range of the basic field of view is a value determined through an experiment in advance and needs to be stored in a storage location of the signal-processing device 241 or a separate storage location 244.

The control device 242 of the rollable display device 240 activates the driving device 245 to adjust the height of the rollable monitor 243 determined by the signal-processing device 241.

The rollable monitor 243 of the rollable display device 240 reproduces images of a conventional cluster and AVNT on the one portion thereof and reproduces images of the low area in front of the vehicle on another portion thereof. The rollable display device 240 according to the present disclosure may be installed so as to be recessed into the dashboard of the vehicle, and may be detachably used on an upper surface of the dashboard. In any embodiment, the rollable monitor 243 is wound inside a body (not illustrated) of the rollable display device 240 when not in use, and extends from the body under the control of the control device 242 and the driving device 245 so as to be visible to the driver.

The storage device 244 of the rollable display device 240 stores information about a basic field of view according to the eye level of the driver and a basic field of view of the driver according to the inclination of the vehicle.

The driving device 245 of the rollable display device 240 controls movement of the rollable monitor 243 according to an instruction from the control device 242.

The shape of the rollable display device 240 may vary, and will not be described in detail here since such a device has already been marketed and used.

Figure 3:
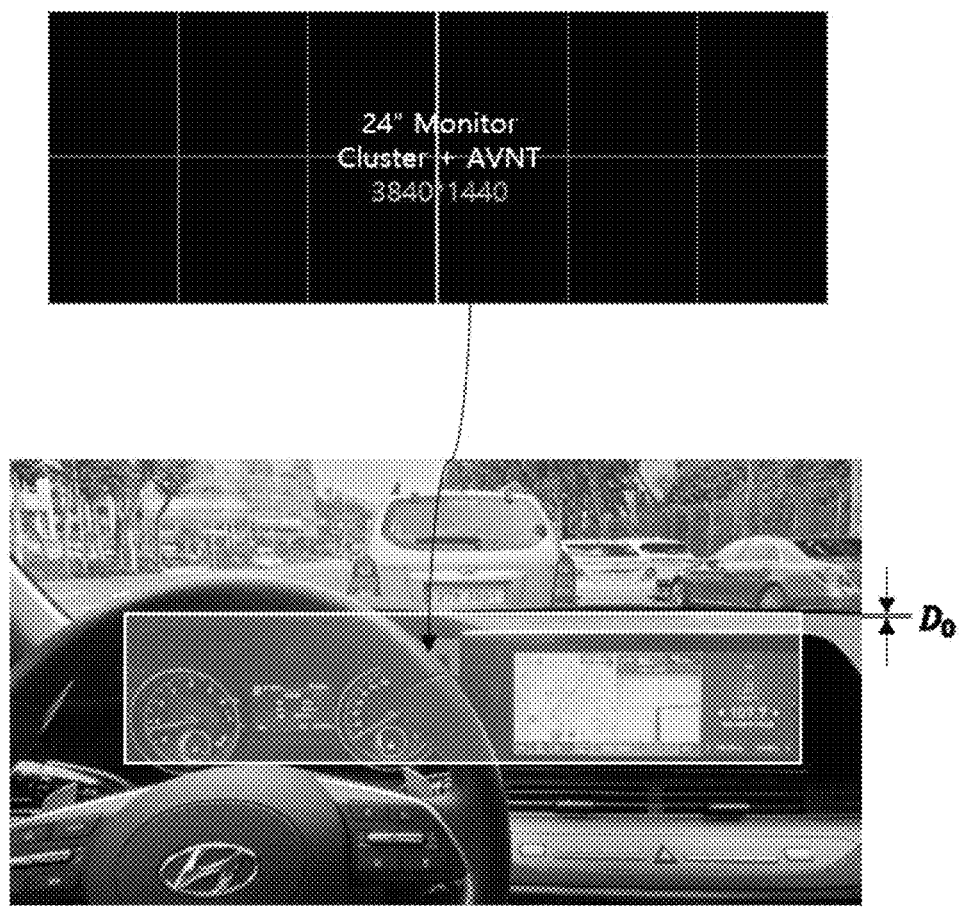
FIG. 3 describes an example of use of a rollable monitor included in the rollable display system.

FIG. 3 describes an example of use of the rollable monitor included in the rollable display system.

Referring to FIG. 3, the rollable monitor 243 according to the present disclosure covers the cluster and AVNT regions of the vehicle at the same time, and provides an image of the low area in front of the vehicle without interfering with the basic field of view of the driver by adjusting the height thereof.

Figure 1:
FIG. 1 describes a conventional example of a front panel of a vehicle.

Referring to FIG. 1, compared to the cluster and AVNT each divided into 3 regions, the rollable monitor 243 illustrated in FIG. 3 is divided into 12 regions as a whole, and the width is divided into six regions, which is the same as the conventional case illustrated in FIG. 1. However, the six divided regions are disposed at each of the top and bottom, so that a reproduction region may be expanded while adjusting the height of the rollable monitor 243.

A horizontal line marked in the middle of the regions of the rollable monitor 243 divides the upper six regions and the lower six regions. The upper six regions perform the same functions as those of the conventional cluster and AVNT, and the lower six regions are utilized as regions that complement the basic field of view of the driver, so that, from the perspective of the eyes of the driver, a certain space $D_0$ formed between an upper surface of the cluster and AVNT and a boundary part of a dashboard and a windshield may be minimized.

It is preferable that the upper surface of the rollable monitor 243 be located adjacent to the field of view seen through the front glass window of the vehicle.

According to an embodiment, all of the upper six regions and the lower six regions may be used as the cluster and AVNT, and all of the upper six regions and the lower six regions may be used as regions extending the basic field of view of the driver, which differs depending on the scheme of setting a regeneration condition in the signal-processing device 241.

Figure 4:
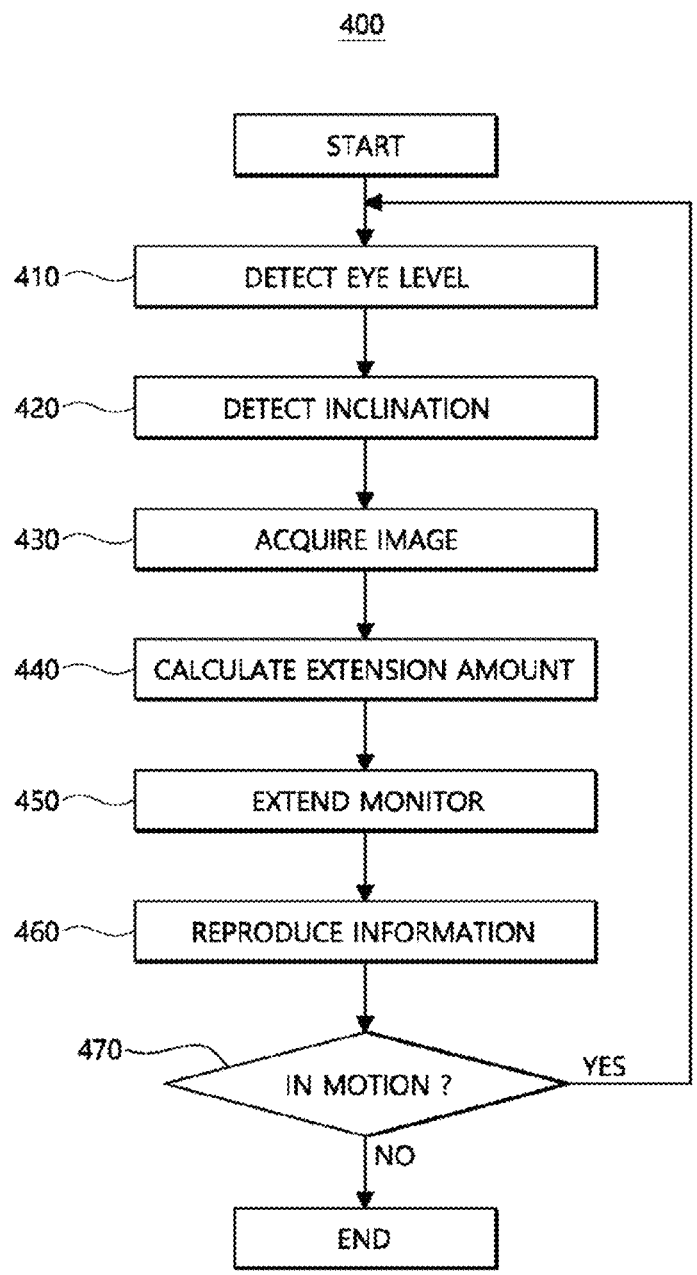
FIG. 4 is an embodiment of a method of adaptively adjusting a view range of the rollable monitor in consideration of a driver according to the present disclosure.

FIG. 4 is an embodiment of a method of adaptively adjusting a view range of the rollable monitor in consideration of the driver according to the present disclosure.

Referring to FIG. 4, a method 400 of adaptively adjusting the view range of the rollable monitor in consideration of the driver according to the present disclosure includes a step 410 of detecting an eye level of the driver, a step 420 of detecting an inclination of the vehicle, a step 430 of acquiring an image of the low area in front of the vehicle, a step 440 of calculating an extension height of the rollable monitor in consideration of the eye level of the driver and the inclination of the vehicle, a step 450 of extending the rollable monitor from the body, a step 460 of reproducing the image of the low area in front of the vehicle in consideration of the eye level of the driver and the inclination of the vehicle, and a step 470 of determining whether the vehicle is in motion.

In the step 410 of detecting the eye level of the driver, the eye level of the driver is detected immediately after the driver gets in the vehicle and turns on the ignition.

In the step 420 of detecting the inclination of the vehicle, the inclination of the vehicle, which changes when the vehicle is stopped or in motion, is detected.

In the step 430 of acquiring the image of the low area in front of the vehicle, the image of the low area in front of the vehicle is acquired in real time.

In the step 440 of calculating the extension height of the rollable monitor in consideration of the eye level of the driver and the inclination of the vehicle, the extension height of the rollable monitor 243 is calculated by comparing the eye level of the driver and the inclination of the vehicle detected by the signal-processing device 241 with information about the basic field of view of the driver stored in advance.

In the step 450 of extending the rollable monitor from the body, the control device 242 extends the rollable monitor 243 by a height according to a result calculated by the signal-processing device 241.

In the step 460 of reproducing the image of the low area in front of the vehicle in consideration of the eye level of the driver and the inclination of the vehicle, the signal-processing device 241 reproduces the image of the low area in front of the vehicle using the information about the basic field of view. As described above, since cluster information and AVNT information are reproduced on in an upper part of the rollable monitor 243 as in the past, and the image of the low area in front of the vehicle is reproduced in a lower part thereof, the area of the lower part of the rollable monitor 243 which opens depending on the height of the rollable monitor 243 may increase or decrease.

In the step 470 of determining whether the vehicle is in motion, whether the vehicle is in motion is detected, and when the vehicle is stopped (470, No), performance of the method 400 of adaptively adjusting the view range of the rollable monitor in consideration of the driver according to the present disclosure is suspended, and when it is determined that the vehicle is in motion (270, Yes), the step 410 of detecting the eye level of the driver is performed.

Figure 5:
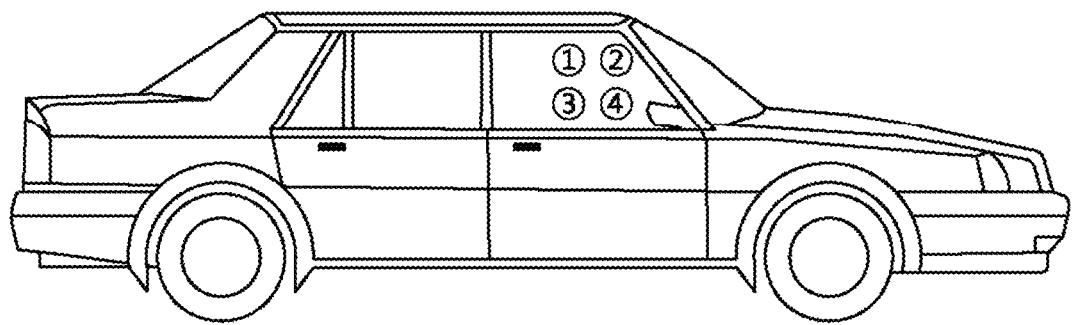
FIG. 5 is an example of various eye levels of a driver in a vehicle.

FIG. 5 is an example of various eye levels of the driver in the vehicle.

Referring to FIG. 5, it is assumed that ① and ② each indicate the case where the eye level of the driver is higher than that of ③ and ④, ① and ② each indicate the case where the driver is seated on a backward part of the seat, and ② and ④ each indicate the case where the driver is seated on a forward part of the seat.

Figure 6:
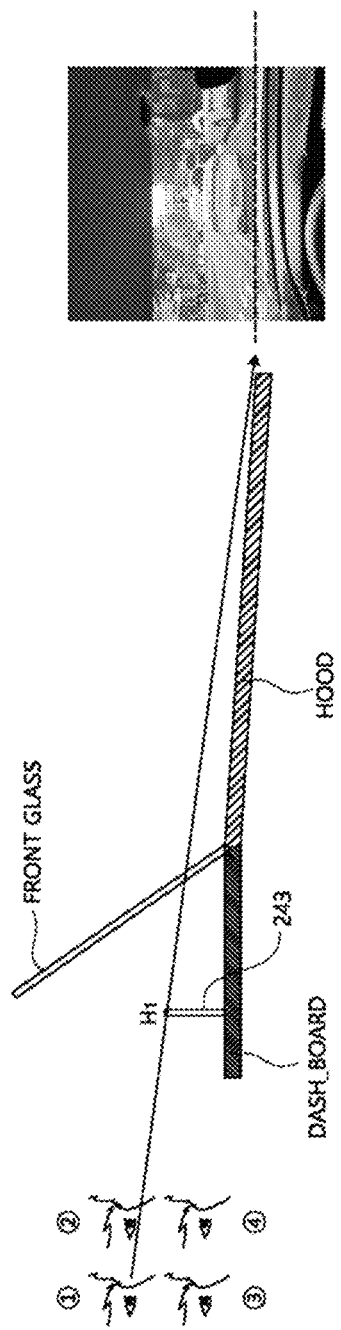
FIG. 6 illustrates a basic field of view when an eye level of the driver is high and the driver is seated on a backward part of a seat.

FIG. 6 illustrates the basic field of view when the eye level of the driver is high and the driver is seated on the backward part of the seat.

Referring to FIG. 6, it is possible to check a maximum height $H_1$ of the rollable monitor 243 and the appearance of the front part of the vehicle visible to the eyes of the driver at this time when the eye level of the driver is ①. A dotted line in a horizontal direction in the photo on the right is an end of a hood and indicates a lowest part of the vision of the driver.

Figure 7:
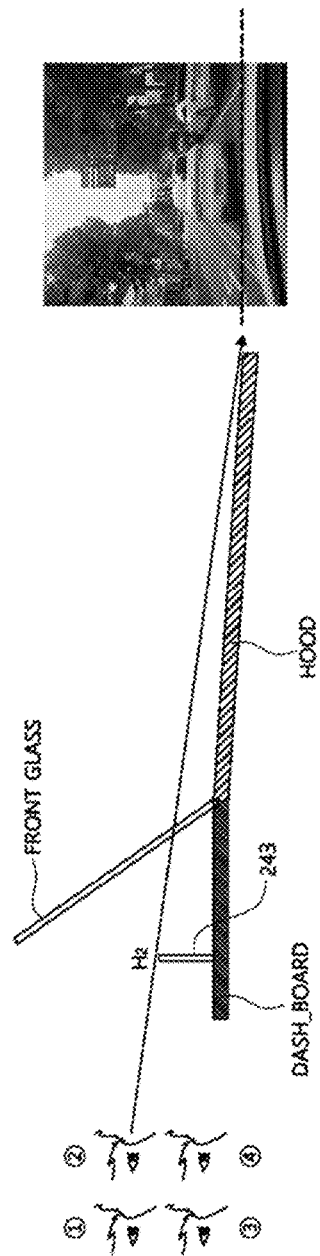
FIG. 7 illustrates a basic field of view when the eye level of the driver is high and the driver is seated on a forward part of the seat.

FIG. 7 illustrates the basic field of view when the eye level of the driver is high and the driver is seated on the forward part of the seat.

Referring to FIG. 7, it is possible to check a maximum height $H_2$ of the rollable monitor 243 and the appearance of the front part of the vehicle visible to the eyes of the driver at this time when the eye level of the driver is ②. The basic field of view of the driver is vertically longer than that of FIG. 6, and the height of the rollable monitor 243 may be increased compared to FIG. 6.

Figure 8:
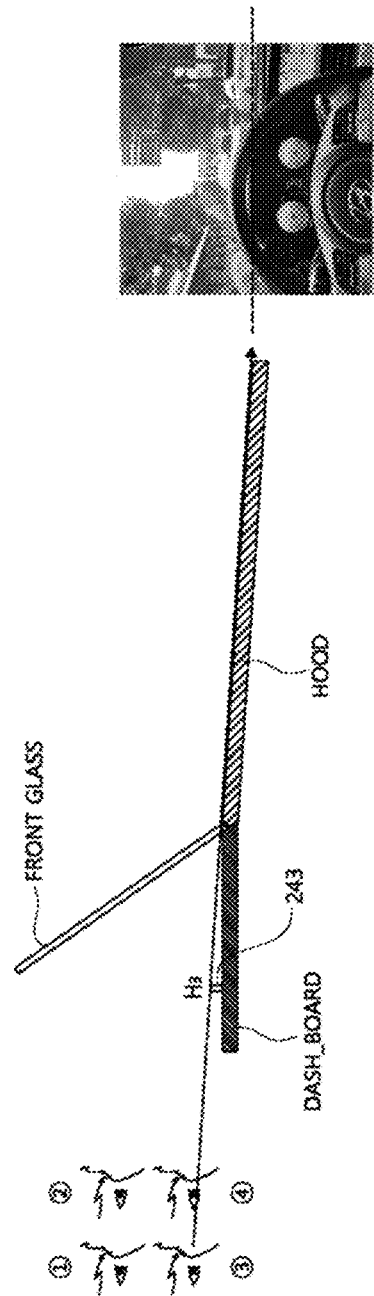
FIG. 8 illustrates a basic field of view when the eye level of the driver is low and the driver is seated on the backward part of the seat.

FIG. 8 illustrates the basic field of view when the eye level of the driver is low and the driver is seated on the backward part of the seat.

Referring to FIG. 8, it is possible to check a maximum height $H_3$ of the rollable monitor 243 and the appearance of the front part of the vehicle visible to the eyes of the driver at this time when the eye level of the driver is a. It may be seen that the basic field of view of the driver is vertically narrower than that of FIGS. 6 and 7.

Figure 9:
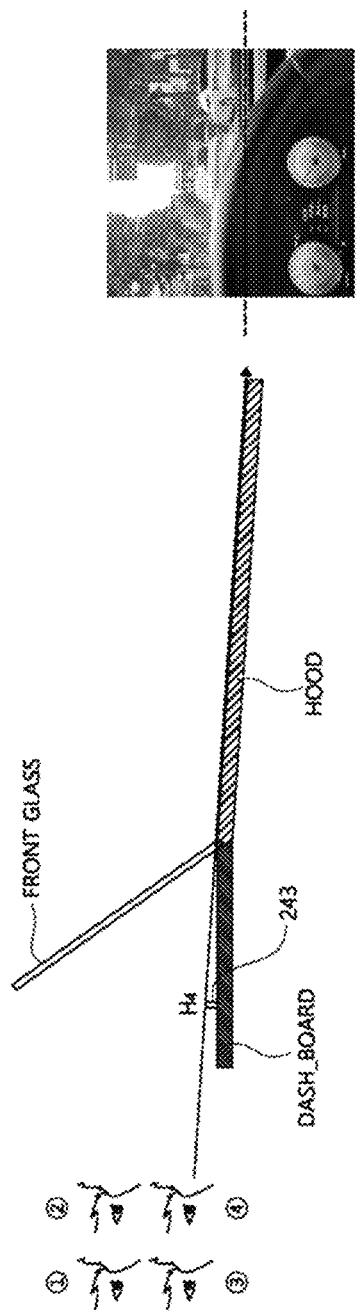
FIG. 9 illustrates a basic field of view when the eye level of the driver is low and the driver is seated on the forward part of the seat.

FIG. 9 illustrates the basic field of view when the eye level of the driver is low and the driver is seated on the forward part of the seat.

Referring to FIG. 9, it is possible to check a maximum height $H_4$ of the rollable monitor 243 and the appearance of the front part of the vehicle visible to the eyes of the driver at this time when the eye level of the driver is ④. The basic field of view of the driver is vertically longer than that of FIG. 8, and the height of the rollable monitor 243 may be increased compared to FIG. 8.

Referring to FIGS. 6 to 9, it may be seen that there is a difference in the basic field of view of the driver depending on the position and eye level of the driver, and accordingly, the heights of the rollable monitor 243 may be made different from each other. An increase in the height of the rollable monitor 243 and an increase in the area of the lower part of the rollable monitor 243 due to the increase in the height mean that a larger image of the low area in front of the vehicle may accordingly be reproduced.

Figure 10:
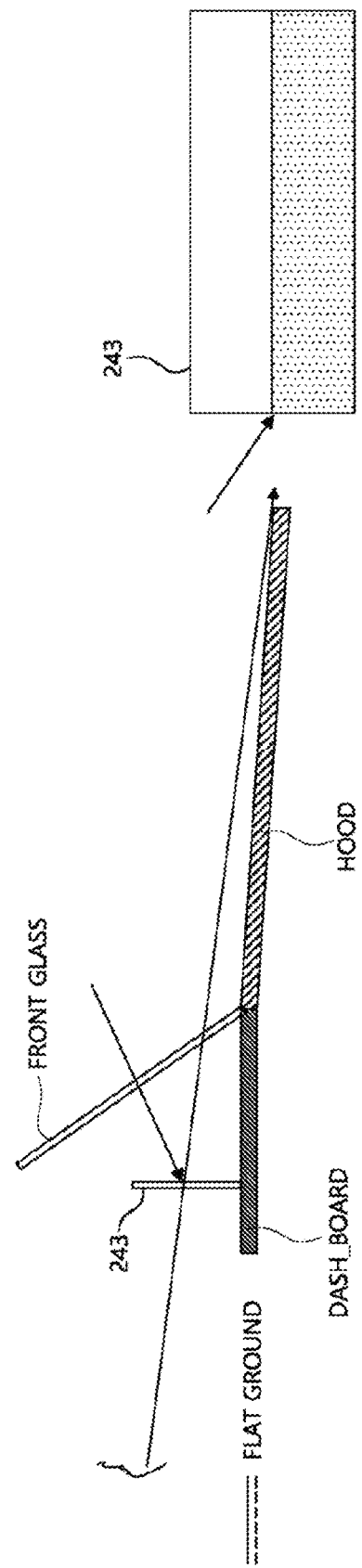
FIG. 10 describes a basic field of view of the driver when the vehicle is traveling on flat ground.

FIG. 10 describes the basic field of view of the driver when the vehicle is traveling on flat ground.

Figure 11:
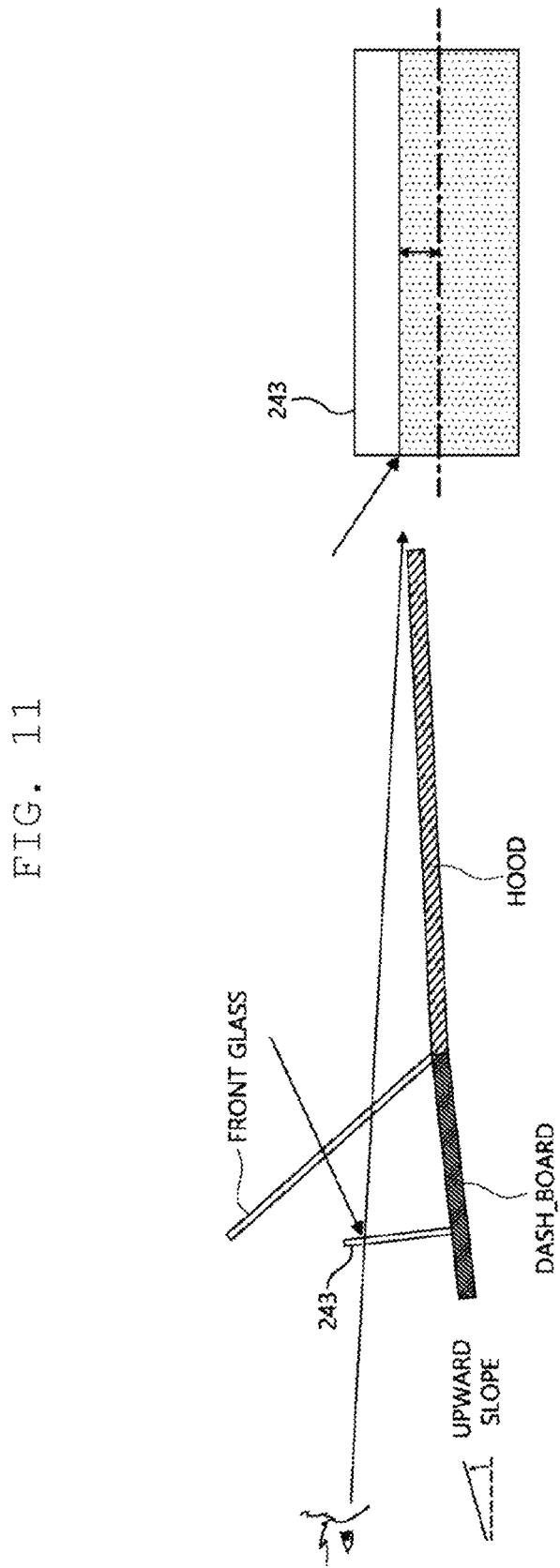
FIG. 11 describes a basic field of view of the driver when the vehicle is traveling on an upward slope.

FIG. 11 describes the basic field of view of the driver when the vehicle is traveling on an upward slope.

FIGS. 10 and 11 are illustrated on the assumption of a state where the height of the rollable monitor 243 during travel on the flat ground and the height of the rollable monitor 243 during travel on the upward slope are the same for convenience of description. Two arrows each point to the same location.

It may be seen that, while 50% of the area of the rollable monitor 243 from the top is included in the basic field of view when the vehicle is traveling on the flat ground (FIG. 10), 25% of the area of the rollable monitor 243 from the top is included in the basic field of view when the vehicle is traveling on the upward slope (FIG. 11). In this case, the signal-processing device 241 may reproduce the image of the low area of the vehicle in 50% of the area of the rollable monitor 243 from the bottom when the vehicle is traveling on the flat ground, and in 75% of the area of the rollable monitor 243 from the bottom when the vehicle is traveling on the upward slope, thereby compensating for a reduced or narrowed angle of the basic field of view of the driver.

The present disclosure described above may be implemented as computer-readable code on a medium in which a program is recorded. The computer-readable medium includes all types of recording devices in which data readable by a computer system is stored. Examples of the computer-readable medium include a hard disk drive (HDD), a solid-state drive (SSD), a silicon disk drive (SDD), a ROM, a RAM, a CD-ROM, a magnetic tape, a floppy disk, an optical data storage device, etc.

As described above, the rollable display system and the method of adaptively adjusting the view range of the rollable monitor in consideration of the driver according to the present disclosure may ensure a wider field of view when compared to the conventional cluster and AVNT, and are particularly advantageous in ensuring a field of view at a point where a hill ends while traveling on a hill slope, and thus have an advantage of providing a safe driving environment.

The effects obtainable in the present disclosure are not limited to the above-mentioned effects, and other effects not mentioned herein may be clearly understood by those of ordinary skill in the art to which the present disclosure belongs from the above description.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A rollable monitor system comprising:
   an image acquisition device configured to acquire an image of a low area in front of a vehicle;
   an inclination detection device configured to detect an inclination of the vehicle;
   an eye level detection device configured to detect an eye level of a driver; and
   a rollable display device installed in a dashboard of the vehicle or attached to an upper part of the dashboard, and configured to adjust a height of a rollable monitor mounted inside using the inclination and the eye level and to reproduce the image on the rollable monitor.

2. The rollable monitor system according to claim 1, wherein the rollable display device includes:
   a signal-processing device configured to determine an installation height of the rollable monitor based on a basic field of view, the basic field of view determined according to the inclination and the eye level;
   a control device configured to control a driving device to adjust the height of the rollable monitor based on the determined installation height; and
   the rollable monitor configured to reproduce an image of a cluster and audio/video/navigation/telematics (AVNT) on one portion thereof and reproduce the image of the low area in front of the vehicle on another portion thereof.

3. The rollable monitor system according to claim 2, wherein the rollable display device further includes a storage device configured to store information about the basic field of view according to the eye level and the inclination.

4. The rollable monitor system according to claim 1, wherein the image acquisition device includes at least one of a camera and LiDAR.

5. The rollable monitor system according to claim 2, wherein an uppermost part of the rollable monitor is located in a place connected to a field of view seen through a front glass window of the vehicle.

6. A method of adaptively adjusting a view range of a rollable monitor in consideration of a driver, the method comprising:
   detecting, by an eye level detection sensor, an eye level of the driver;
   detecting, by an inclination detection device, an inclination of the vehicle;
   acquiring, by an image acquisition device, an image of a low area in front of the vehicle;
   determining an extension height of the rollable monitor based on a basic field of view which is determined according to the eye level and the inclination; and extending the rollable monitor from a body of a rollable display device including the rollable monitor therein by the calculated extension height.

7. The method according to claim 6, further comprising reproducing, by the signal-processing device, the image of the low area in front of the vehicle on the rollable monitor according to a change in a basic field of view of the driver based on information about a basic field of view.

8. The method according to claim 7, wherein a reproduction region of the rollable monitor for reproducing the image of the low area in front of the vehicle is wider when the vehicle is traveling on a road having a slope than when the vehicle is traveling on flat ground.

9. The method according to claim 6, further comprising:
 determining whether the vehicle is in motion or not,
 in accordance with the determination that the vehicle is in motion, detecting an eye level of the driver to adjust the view range of the rollable monitor,
 in accordance with the determination that the vehicle is not in motion, suspending adjustment of the view range of the rollable monitor.

10. A program being stored in a not-transitory computer readable medium, wherein the program, when executed by a processor, performs the steps of:
 detecting an eye level of the driver;
 detecting an inclination of the vehicle;
 acquiring an image of a low area in front of the vehicle;
 determining an extension height of the rollable monitor based on a basic field of view which is determined according to the eye level and the inclination; and
 extending the rollable monitor from a body of a rollable display device including the rollable monitor therein by the calculated extension height.

11. A non-transitory computer-readable recording medium storing a program for adaptively adjusting a view range of a rollable monitor in a vehicle in consideration of a driver, wherein, when executed by a processor, the program causes the processor to:
 detect, by an eye level detection sensor, an eye level of the driver;
 detect, by an inclination detection device, an inclination of the vehicle;
 acquire, by an image acquisition device, an image of a low area in front of the vehicle;
 determine an extension height of the rollable monitor based on a basic field of view which is determined according to the eye level and the inclination; and
 extend the rollable monitor from a body of a rollable display device including the rollable monitor therein by the extension height.

* * * * *